US009069866B2

(12) United States Patent
Ohazama et al.

(10) Patent No.: US 9,069,866 B2
(45) Date of Patent: Jun. 30, 2015

(54) METHOD FOR GENERATING LOCATION TARGETED, KEYWORD-TRIGGERED, ADS AND GENERATING USER RECALLABLE LAYER-BASED ADS

(75) Inventors: Chikai J. Ohazama, San Francisco, CA (US); Joshua Sacks, San Carlos, CA (US); Chia-Nee Michelle Chen, Mountain View, CA (US); Sanjay Gajanan Mavinkurve, Toronto (CA); Amin P. Charaniya, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 12 days.

(21) Appl. No.: 13/613,239

(22) Filed: Sep. 13, 2012

(65) Prior Publication Data

US 2013/0132396 A1 May 23, 2013

Related U.S. Application Data

(63) Continuation of application No. 12/418,968, filed on Apr. 6, 2009, now Pat. No. 8,306,973.

(51) Int. Cl.
*G06F 17/30* (2006.01)
*G06Q 30/02* (2012.01)

(52) U.S. Cl.
CPC ............ *G06F 17/3087* (2013.01); *G06Q 30/02* (2013.01)

(58) Field of Classification Search
USPC .................................. 707/724, 743, 754, 756
See application file for complete search history.

(56) References Cited

U.S. PATENT DOCUMENTS

| 2006/0101005 | A1* | 5/2006 | Yang et al. ........................ 707/3 |
| 2008/0016472 | A1 | 1/2008 | Rohlf et al. |
| 2008/0046315 | A1 | 2/2008 | Axe et al. |
| 2008/0065694 | A1* | 3/2008 | Qian .......................... 707/104.1 |
| 2008/0086368 | A1 | 4/2008 | Bauman et al. |
| 2008/0109761 | A1* | 5/2008 | Stambaugh ................... 715/853 |
| 2008/0214166 | A1 | 9/2008 | Ramer et al. |
| 2008/0301643 | A1 | 12/2008 | Appleton et al. |
| 2008/0313039 | A1* | 12/2008 | Altberg et al. .................. 705/14 |

OTHER PUBLICATIONS

Official Action in Canadian Patent Application No. 2,757,700, dated Nov. 13, 2012.
Potmesil Michael, Maps Alive: Viewing Geospatial Information on the WWW, http://geckil.com/~harvest/www6/Technical/Paper130/Paper130 . . . , downloaded Feb. 19, 2009, pp. 19.
KML Tutorial, http://code.google.com/apis//kml/documentation/kml_tut.html, downloaded Aug. 1, 2008, pp. 12.
International Search Report PCT/US 10/28806 Dated May 18, 2010.

* cited by examiner

*Primary Examiner* — Belix M Ortiz Ditren
(74) *Attorney, Agent, or Firm* — Dority & Manning, P.A.

(57) ABSTRACT

Location-specific content is automatically generated for a particular entity having a plurality of physical locations. Database entries that contain identifying data associated with the particular entity are searched for to obtain location information of each of the plurality of physical locations. The location information, in correlation with one or more keywords associated with the particular entity, is stored in a computer-readable electronic database such that a user-generated query that includes at least one of the keywords and a search location causes a processor to execute operations that initiates a search of the computer-readable electronic database for the location information of the physical locations that are in proximity to the search location. At least one result that is displayable to the user is provided.

29 Claims, 12 Drawing Sheets

FIG. 6

METHOD FOR GENERATING LOCATION TARGETED, KEYWORD-TRIGGERED, ADS AND GENERATING USER RECALLABLE LAYER-BASED ADS

CROSS-REFERENCE TO RELATED APPLICATIONS

The present application is a continuation of U.S. patent application Ser. No. 12/418,968 filed Apr. 6, 2009, the entire disclosure of which is hereby incorporated herein by reference.

BACKGROUND OF THE INVENTION

The present invention is directed to on-line advertising and, more particularly, to the generation of data for on-line advertising and to the display of on-line advertising.

The display of keyword-triggered advertisements on the same web pages that provide responses to Internet search queries has been shown to be extremely profitable. Typically, users carry out searches of the Internet by entering one or more keywords as a query into a search engine or similar web page. The search engine then provides the results of the search on one more web pages that show the search results arranged according to some predetermined order or ranking.

Recently, location-based advertising has been introduced to deliver advertisements that are targeted to the current location of a user or to a location specified by the user as part of the search query. As an example, in response to a user query for camera stores located in Manhattan, the user may be shown ads for stores located solely in New York City. However, the generation of a sufficient inventory of location-based ads for a given advertiser is often difficult. In addition to storing the ad content and keywords that are currently used to supply keyword-triggered advertisements, every store location of the advertiser may also need to be stored, thereby greatly increasing the amount of information to be stored.

Inventories of location-based advertisements are often generated by manually entering store locations into a file. For large chain advertisers, large amounts of data must be entered and such entry is often too cumbersome to be worth their effort. Alternatively, some mechanism for uploading data files containing store locations is provided. For entry or file uploading to be carried out, however, both the advertiser and the search engine provider must agree on a common format for the data as well as agree on a method of periodically updating and/or uploading the data. As a result, location-based advertising has not been adopted by many advertisers.

Often, a pay-per-click (PPC) advertising model is used in which the advertiser only pays when a user actually clicks on an advertisement to visit the web site of the advertiser. However, many businesses are not interested in the Internet traffic generated by an ad as their sales are more dependent on the amount of "foot-traffic" such ads generate, i.e., the number customer drawn into their stores by an ad. For such advertisers, ads that merely provide customers with a link to the advertisers' web site is not that valuable.

Some mapping sites display conventional content-advertisements based on locations shown on a map in response to a location inquiry by a user. Such advertisements, however, may not be targeted to the particular interests of the user. Alternatively, other mapping sites provide permanent links which show the advertiser's locations on the map. Such advertisements likewise do not target the user's interest and may be of little help to the user.

Keyword-triggered ads may also be sold which appear directly on the displayed map. However, advertisements in this form may be of limited value to advertisers because only a few lines of ad copy can be shown and often only appear for limited durations. Moreover, such advertisements do not show other information that is of interest to the user, such as the advertiser's retail locations, and do not provide the user with any relation between the displayed map and the advertised business, such as by showing store locations on the map.

SUMMARY OF THE INVENTION

In accordance with aspects of the present invention, an advertising model for local search queries which provides trackable value to advertisers as well as being useful to users.

An aspect of the invention is a method of automatically generating location-specific content for a particular entity having a plurality of physical locations. Database entries that contain identifying data associated with the particular entity are searched for to obtain location information of each of the plurality of physical locations. The location information, in correlation with one or more keywords associated with the particular entity, is stored in a computer-readable electronic database such that a user-generated query that includes at least one of the keywords and a search location causes a processor to execute operations that initiates a search of the computer-readable electronic database for the location information of the physical locations that are in proximity to the search location. At least one result that is displayable to the user is provided.

In accordance with this aspect of the invention, the identifying data may be a name of the particular entity or a uniform resource locator (URL) of a web site associated with the particular entity. Searching within on-line content associated with the particular entity may be performed by matching identifying data contained within the on-line content to identical data contained within the entries. At least one of a business listing data feed, a web site, or a data file may be searched. One or more details relating to each physical location may be stored, and the details relating to a given physical location may be selected from the group consisting of a photograph of that physical location, hours of operation for that physical location, a telephone number of that physical location, a URL of a web site for that physical location, and an icon indicating an attribute for that physical location.

Another aspect of the invention is a method of providing location location-specific content for a particular entity having a plurality of physical locations. The location information of each of the plurality of physical locations, in correlation with one or more keywords associated with the particular entity, are stored in a database. A user-entered query, that includes at least one of the keywords and a search location, is received over a network from a user terminal. The database is searched for location information of the physical locations that are in proximity to the search location. A map of a region that includes the search location is generated. An overlying layer is generated for the map and includes one or more markers that are positioned to overlay the map at the physical locations that are located within the map region. At least the map is transmitted over the network to the user terminal for display on a display screen.

In accordance with this aspect of the invention, the one or more markers of the overlying layer may be icons associated with the particular entity or favicons associated with a web site of the particular entity. The overlying layer may be transmitted together with the map such that the map and the overlying layer are initially shown concurrently on the display screen. A user interface element that can be activated to turn on or off the displaying of the overlying layer may be provided on the display screen. Content may be generated for the particular entity, and the content together with the map may be transmitted such that the map and the content are shown concurrently at different regions of the display screen. A list of the physical locations that are located within the map region may be generated, and the list may include one or more details relating to each listed physical location which are selected from the group consisting of the address of that physical location, a photograph of that physical location, hours of operation for that physical location, a telephone number of that physical location, a URL of a web site for that physical location, and an icon indicating an attribute for that physical location. The list together with the map may be transmitted such that map and the list are initially shown concurrently at different regions of the display screen. Each of the markers of the overlying layer may be unique to that physical location, and the list of the physical locations may include, for each physical location, the marker that overlies that physical location. A further overlying layer that includes at least part of the list may be generated, and a user interface element that can be activated to turn on the displaying of the further overlying layer may be provided on the display screen together with the map, the further overlying layer obscuring at least part of the map. A user interface element that can be activated to turn off the displaying of the further overlying layer may be provided on the display screen together with the further overlying layer.

Yet another aspect of the invention is a method of obtaining location-specific content for a particular entity having a plurality of physical locations. A user-entered query that includes at least one of keywords and a search location is transmitted over a network to a remote facility. A map of a region that includes the search location is received from the remote facility. An overlying layer for the map is received from the remote facility and includes one or more markers that are positioned to overlay the map at the physical locations located within the map region. At least the map is displayed as part of a display screen.

In accordance with the above aspect of the invention, the one or more markers of the overlying layer may be icons associated with the particular entity or favicons associated with a web site of the particular entity. The map and the overlying layer may be initially displayed concurrently on the display screen. A user interface element that can be activated to turn on or off the displaying of the overlying layer may be displayed on the display screen. Content may be received for the particular entity, and the map and the content may be displayed concurrently at different regions of the display screen. A list of the physical locations that are located within the map region may be received, and the list may include one or more details relating to each listed physical location which are selected from the group consisting of the address of that physical location, a photograph of that physical location, hours of operation for that physical location, a telephone number of that physical location, a URL of a web site for that physical location, and an icon indicating an attribute for that physical location. The map and the list may be initially displayed concurrently at different regions of the display screen. Each of the markers of the overlying layer may be unique to that physical location, and the list of the physical locations may include, for each physical location, the marker that overlies that physical location. A further overlying layer that includes at least part of the list may be received, and a user interface element that can be activated to turn on the displaying of the further overlying layer, the further overlying layer obscuring at least part of the map. A user interface element that turns off the displaying of the further overlying layer may be displayed together with the further overlying layer.

A further aspect of the invention is a system for automatically generating location-specific content for a particular entity having a plurality of physical locations. A memory stores a computer-readable electronic database. A processor searches for database entries that contain identifying data associated with the particular entity to obtain location information of each of the plurality of physical locations, stores, in the computer-readable electronic database, the location information in correlation with one or more keywords associated with the particular entity such that a user-generated query that includes at least one of the keywords and a search location causes a processor to execute operations that initiates a search of the computer-readable electronic database for the location information of the physical locations that are in proximity to the search location, and provides at least one result that is displayable to the user.

In accordance with this further aspect of the invention, the identifying data may be a name of the particular entity or a uniform resource locator (URL) of a web site associated with the particular entity. The processor may search within on-line content associated with the particular entity by matching identifying data contained within the on-line content to identical data contained within the entries. The processor may search at least one of a business listing data feed, a web site, or a data file. The processor may store in the memory one or more details relating to each physical location, and the details relating to a given physical location may be selected from the group consisting of a photograph of that physical location, hours of operation for that physical location, a telephone number of that physical location, a URL of a web site for that physical location, and an icon indicating an attribute for that physical location.

A still further aspect of the invention is a system for providing location location-specific content for a particular entity having a plurality of physical locations. A server includes: a memory that stores a computer-readable electronic database, and a processor that stores, in the database, the location information of each of the plurality of physical locations in correlation with one or more keywords associated with the particular entity, receives a user-entered query that includes at least one of the keywords and a search location over a network from a user terminal, searches the database for location information of the physical locations that are in proximity to the search location, generates a map of a region that includes the search location, generates an overlying layer for the map, the overlying layer including one or more markers that are positioned to overlay the map at the physical locations that are located within the map region, and transmits at least the map over the network to the user terminal for display on a display screen.

In accordance with this still further aspect of the invention, the one or more markers of the overlying layer may be icons associated with the particular entity or favicons associated with a web site of the particular entity. The processor may transmit the overlying layer together with the map such that the map and the overlying layer are initially shown concurrently on the display screen. The processor may transmit to the user terminal, for display on the display screen, a user interface element that can turn on or off the displaying of the overlying layer. The processor may generate content for the particular entity, and wherein the transmitting step includes transmitting the content together with the map such that the map and the content are shown concurrently at different regions of the display screen. The processor may generate a list of the physical locations that are located within the map region, the list including one or more details relating to each listed physical location which are selected from the group consisting of the address of that physical location, a photograph of that physical location, hours of operation for that physical location, a telephone number of that physical location, a URL of a web site for that physical location, and an icon indicating an attribute for that physical location. The processor may transmit the list together with the map such that the map and the list are initially shown concurrently at different regions of the display screen. Each of the markers of the overlying layer may be unique to that physical location, and the list of the physical locations may include, for each physical location, the marker that overlies that physical location. The processor may generate a further overlying layer that includes at least part of the list, and to provide to the user terminal, for display on the display screen together with the map, a user interface element that can turn on the displaying of the further overlying layer, the further overlying layer obscuring at least part of the map. The processor may provide to the user terminal, for display on the display screen together with the further overlying layer, a user interface element that can turn off the displaying of the further overlying layer.

In the present application, the term "location-specific content" includes location based advertisements. Moreover, the term "entity" as used in the present application includes individuals, businesses, government entities, non-profits, etc. Additionally, the term "physical location" as used in the present application includes any physical location of such individuals, businesses, government entities, non-profits, etc.

The foregoing aspects, features and advantages of the present invention will be further appreciated when considered with reference to the following detailed description and accompanying drawings.

BRIEF DESCRIPTION OF THE DRAWINGS

FIG. 6 shows a web page that displays the results of a keyword-based search using layers in accordance with the invention.

DETAILED DESCRIPTION

Figure 1:
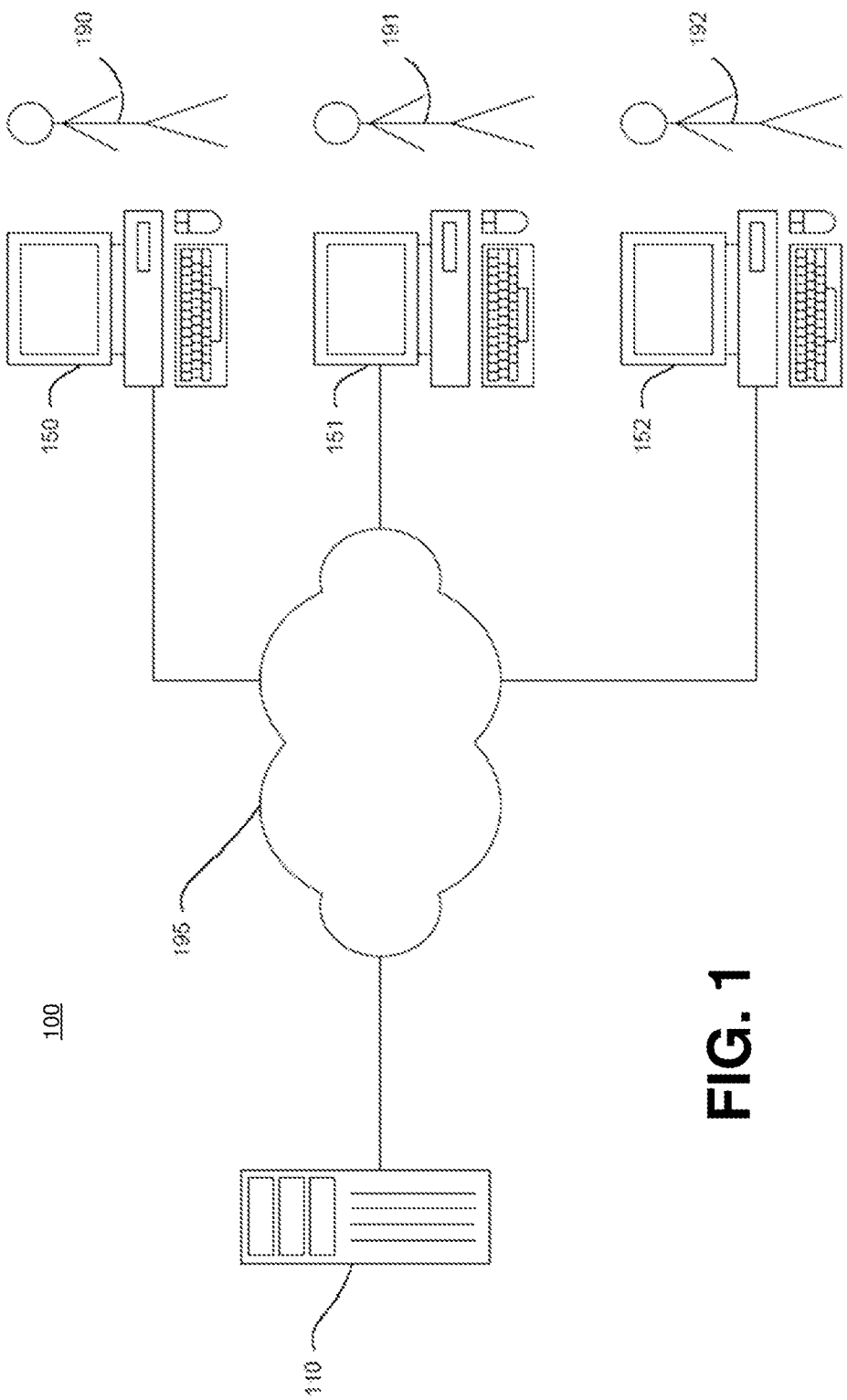
FIG. 1 is a block diagram illustrating a system in accordance with an embodiment of the invention.
Figure 2:
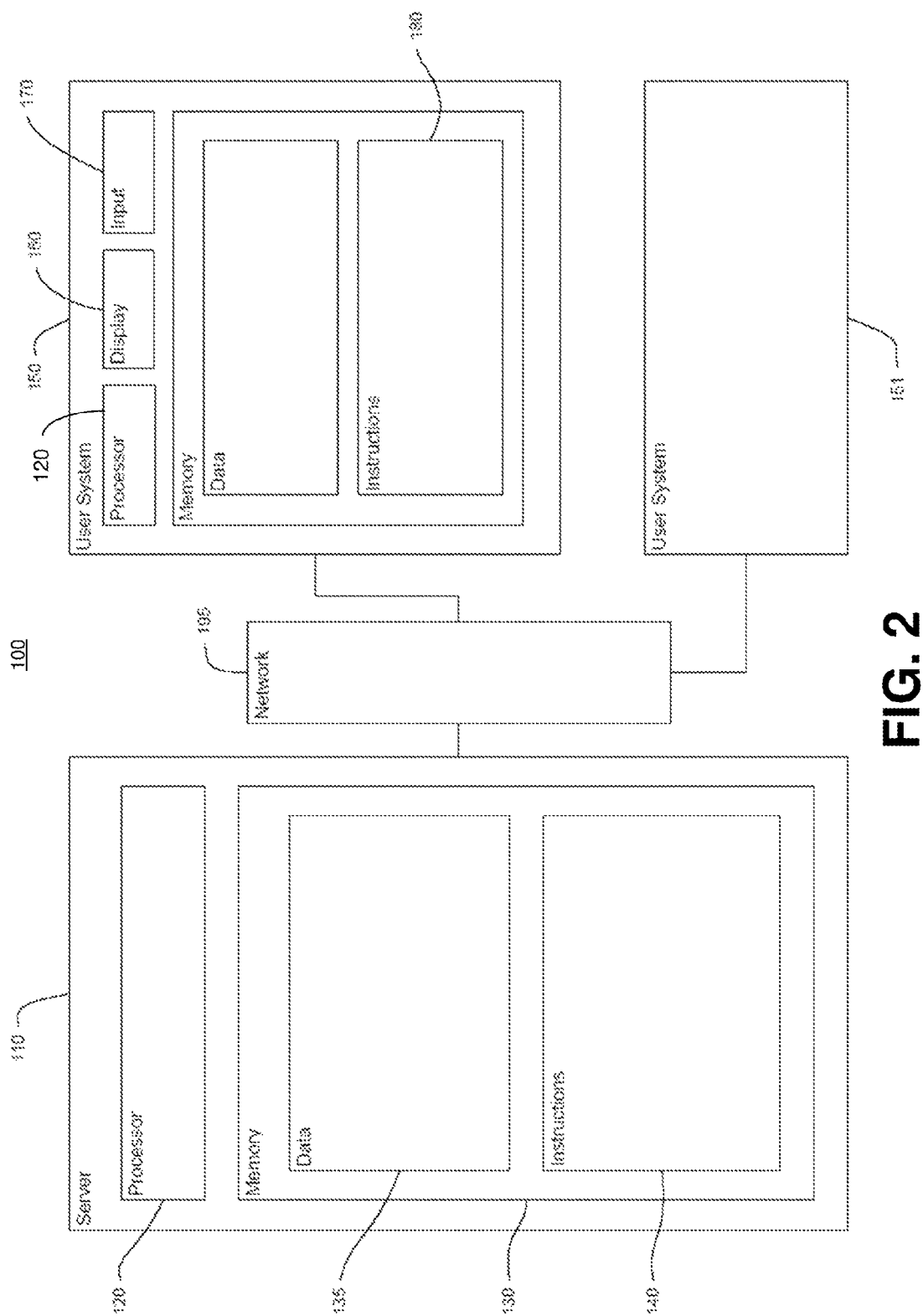
FIG. 2 is a block diagram showing the system of FIG. 1 in greater detail.

As shown in FIGS. 1 and 2, an example of a system 100 in accordance with aspects of the present invention includes computers 150, 151, 152 in communication with one another, such as over a network 195, and may include a server 110. As shown in FIG. 2, the server 110 may contain a processor 120, memory 130, and other components typically present in a computer.

The memory 130 stores information accessible by processor 120, including instructions 140 (e.g., an algorithm) that may be executed by the processor 120, and data 135 that may be retrieved, manipulated, and/or stored by the processor. The memory may be of any type capable of storing information accessible by the processor, such as a hard-drive, ROM, RAM, CD-ROM, write-capable or read-only memories.

The processor 120 may comprise any number of well known processors, such as processors sold by Intel Corporation. Alternatively, the processor may be a dedicated controller for executing operations, such as an ASIC.

The instructions 140 may comprise any set of instructions to be executed directly (such as machine code) or indirectly (such as scripts) by the processor. In the present application, the terms "instructions," "steps", and "programs" are used interchangeably. Such instructions may be stored in any computer language or format, such as in object code or modules of source code. The functions, methods, and routines of the instructions of the invention are explained in more detail below.

Data 135 may be retrieved, stored or modified by the processor 120 in accordance with the instructions 140. The data may be stored as a collection of data. For example, though the invention is not limited by any particular data structure, the data may be stored in computer registers, in a relational database as a table having a plurality of different fields and records, as XML documents, or in flat files. The data may also be formatted in any computer readable format such as, but not limited to, binary values, ASCII or EBCDIC (Extended Binary-Coded Decimal Interchange Code). Similarly, the data may include images stored in a variety of formats such as vector-based images or bitmap images using lossless (e.g., BMP) or "lossy" (e.g., JPEG) encoding. Moreover, the data may include any information sufficient to identify the relevant information, such as descriptive text, proprietary codes, pointers, references to data stored in other memories (including other network locations), or information used by a function to calculate such relevant data.

Though the processor 120 and the memory 130 are functionally illustrated in FIG. 2 as being within the same block, it is understood that the processor and the memory may actually comprise multiple processors and memories that may or may not be stored within the same physical housing or location. As an example, some or all of the instructions and/or data may be stored on a removable CD-ROM whereas other instructions and/or data may be stored within a read-only computer chip. Some or all of the instructions and/or data may be stored in a location physically remote from, yet still accessible by, the processor. Similarly, the processor may comprise a collection of processors which may or may not operate in parallel.

In an aspect of the invention, the server 110 communicates with one or more client computers 150-52. Each client computer may be configured in a manner similar to the server 110, with a processor, memory and instructions, as well as a user input device 170 and a user output device, such as display 160. Each client computer may be a general purpose computer, intended for use by a person 190, 191, 192, shown in FIG. 1, and having all of the internal components normally found in a personal computer (PC), such as a central processing unit (CPU), a display 160, a CD-ROM, a hard-drive, a mouse, keyboard, a touch-sensitive screen, speakers, a microphone, networking equipment such as a modem and/or a router (i.e., a telephone, cable or other router), as well as all of the components used for connecting these elements to one another.

The server 110 and client computers 150-152 are capable of direct and indirect communication with other computers, such as over the network 195. Although only a few computers are depicted in FIG. 1, it is appreciated that a typical system can include a large number of connected servers and clients, with different computers being located at different nodes of the network. The network 195, as well as any intervening nodes, may comprise various configurations and protocols including the Internet, intranets, virtual private networks, wide area networks, local networks, private networks using communication protocols proprietary to one or more companies, Ethernet local area networks, wireless fidelity ("WiFi") local area networks, and hypertext transfer protocol (HTTP). Communication may be facilitated by any device capable of transmitting data to and receiving data from other computers, such as modems (e.g., dial-up or cable modems), network interfaces and wireless interfaces. The server 110 may be a web server. Although certain advantages are obtained when information is transmitted or received in the manner noted above, other aspects of the invention are not limited to any particular manner of transmission of information. For example, in some aspects of the invention, information may be sent using a recording medium, such as a disk, tape, CD-ROM, or may be sent directly between two computer systems using a dial-up modem. In other aspects, the information may be transmitted in a non-electronic format and then manually entered into the system.

Moreover, computers in accordance with the systems and methods described herein may comprise any device capable of processing instructions, transmitting data to, and/or receiving data from humans and other computers. Such computers may include network computers lacking local storage capability, PDA's with modems, and Internet-capable wireless phones.

An aspect of the invention automates the generation of an inventory of location based advertisements for subsequent use by a search engine or other program that responds to user queries. The automated generation of such advertisements may be carried out within the server 110 of FIG. 1, which may be the same server that executes the search engine program or similar program. Alternatively, the inventory of advertisements may be carried out within one of the user systems 150, 151, 152 and then delivered over the network 195 to a server that runs the search engine program or similar program.

Preferably, the location based advertisement inventory is generated for a business that is already an advertiser so that data regarding the advertiser is already stored in the server 110 or the user system 150, 151, 152. Such advertiser data is matched against a data feed or a file that contains, at the very least, business addresses and telephone numbers. For example, a business name contained in the advertiser data can be used to find entries in a Yellow Pages data feed or other business listing data feed that contains the business name. Alternatively, other information can be matched, such as an Internet address (URL) of an advertiser's web site. Such matching can be carried out using any of a number of known correlation techniques.

As a further alternative, advertiser data can be matched against data stored in a file that is read by the server or user system or that is uploaded to the user system or server. The data in such feeds or files may be transmitted in a markup language containing tags, such as keyhole markup language (KML), or another geographic information system (GIS) format may be used. Updates of the inventory of location-based advertisements may be carried out by simply reading or uploading a new file and then repeating the matching operation described above. As a further alternative, instead of a data feed or file, an online application programming interface (API) can be dynamically accessed to match and accumulate data for the advertisement inventory.

In addition to the addresses and telephone numbers of business locations, other information may also be read from the data feed or file. As an example, the geo-location of each business site may be included as well as the hours and/or days that each business location is open. Additionally, icons may be incorporated that provide information regarding each particular site, such as whether a business is temporarily closed.

Figure 3:
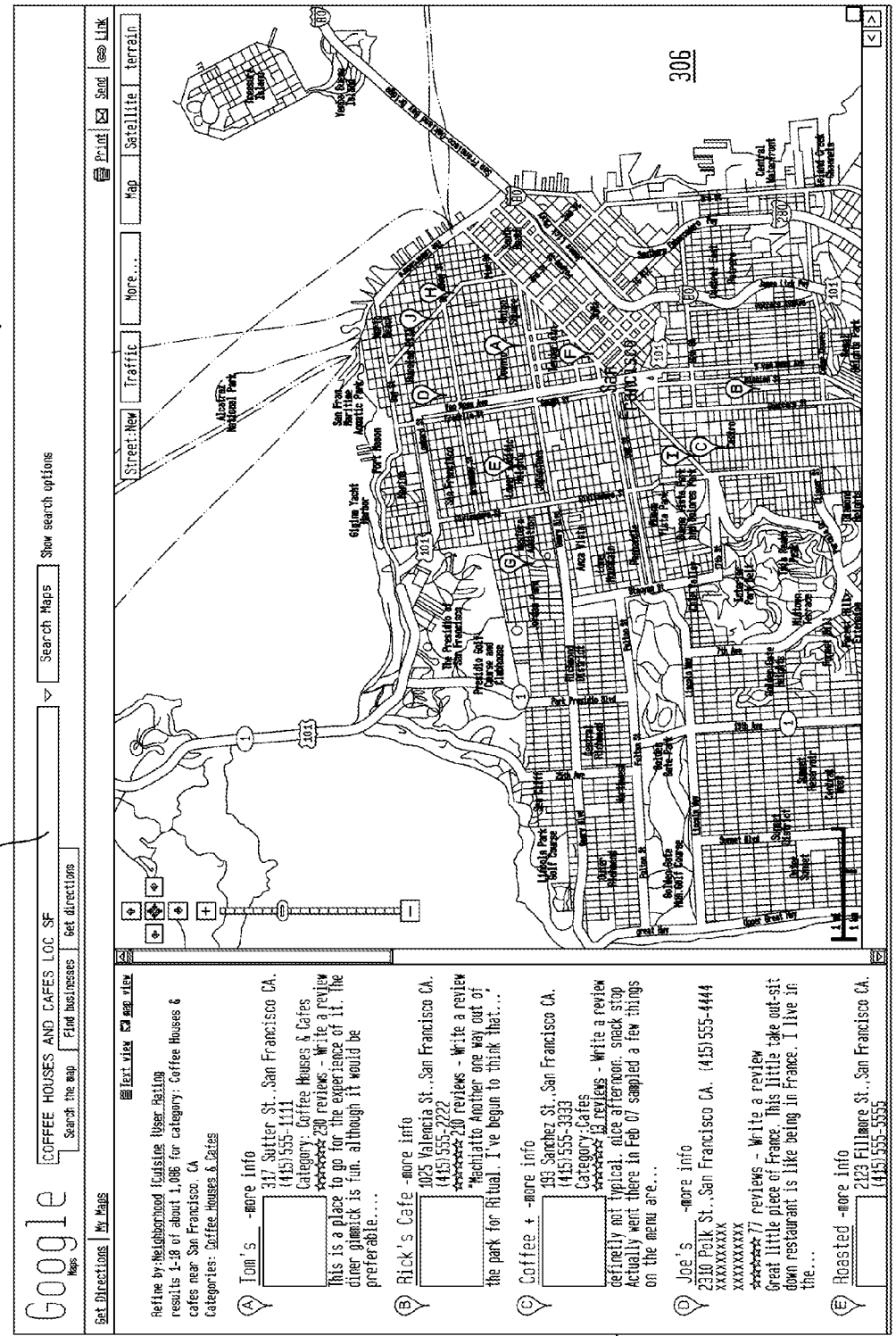
FIG. 3 shows a web page that displays the results of a known keyword-based search.

FIG. 3 shows an example of a web page 300 that displays the results of a known keyword-based search. More specifically, FIG. 3 shows an example in which a user searches for coffee houses and cafes in San Francisco. The user enters search terms that specify the category "Coffee Houses & Cafes" and the location "SF". A list of the search results 304 including the name, address, and telephone number of each located business as well as a portion of a user review. An icon is displayed next to each search result and contains a letter associated with that search result. The icons are also shown on a map 306 and identify where each coffee house or cafe is located on the map.

Though such known web pages may include the display of an advertisement based on keywords which may be used by the search engine or similar program to display a paid advertisement, such search engines or similar programs are unable to provide location based advertisements. As a result, the advertisement does not contain information that is specific to a user's location. For example, for the keyword based search of "coffee houses" and "cafes" in San Francisco, an advertisement for a national chain of coffee houses is displayed but is not specific to San Francisco and, in fact, the advertisement may advertise a national chain that does not have any stores in San Francisco.

Figure 4A:
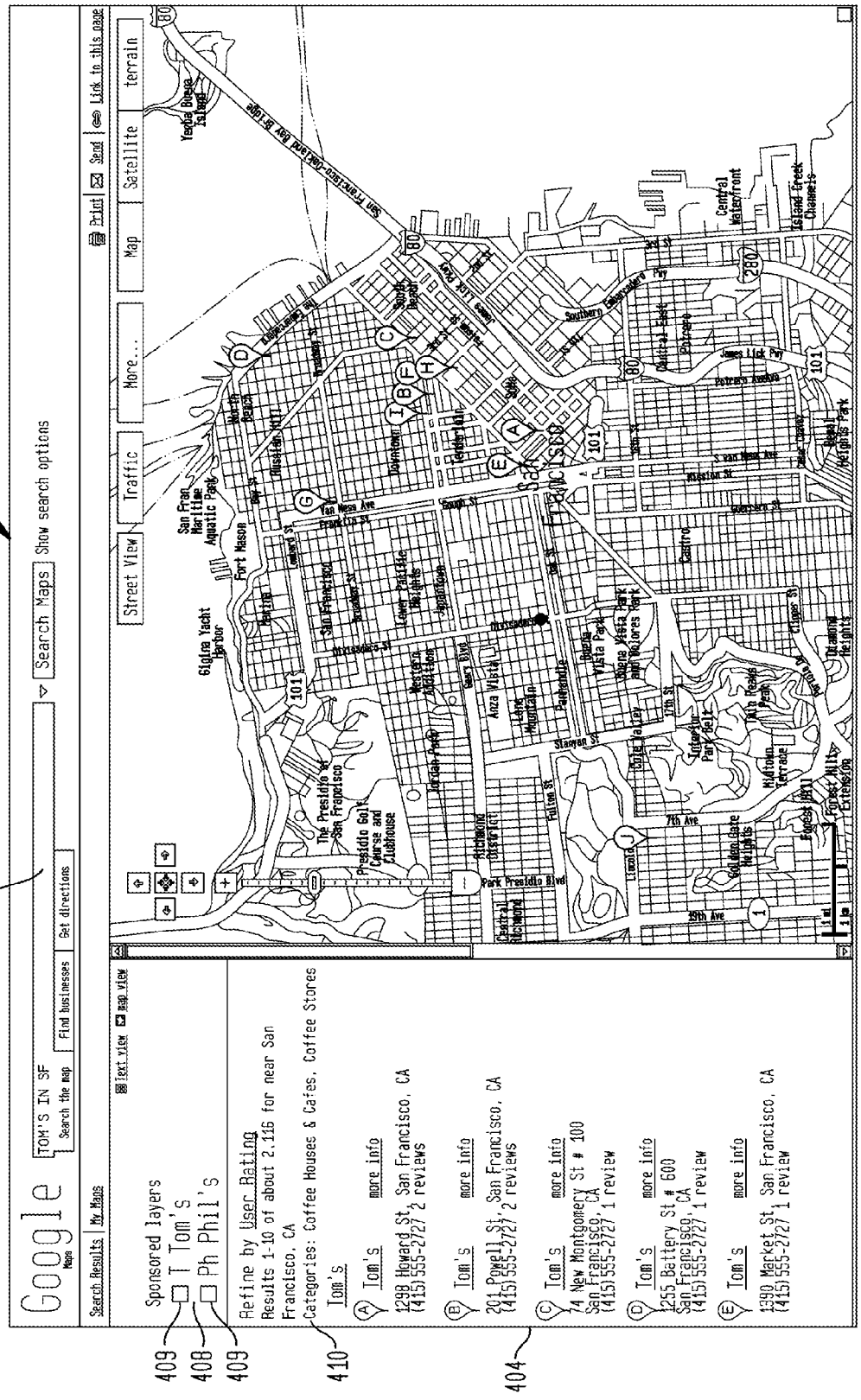
FIGS. 4A-4B show an example of a web page that displays the results of a keyword-based search in accordance with an aspect of the invention.
Figure 4B:
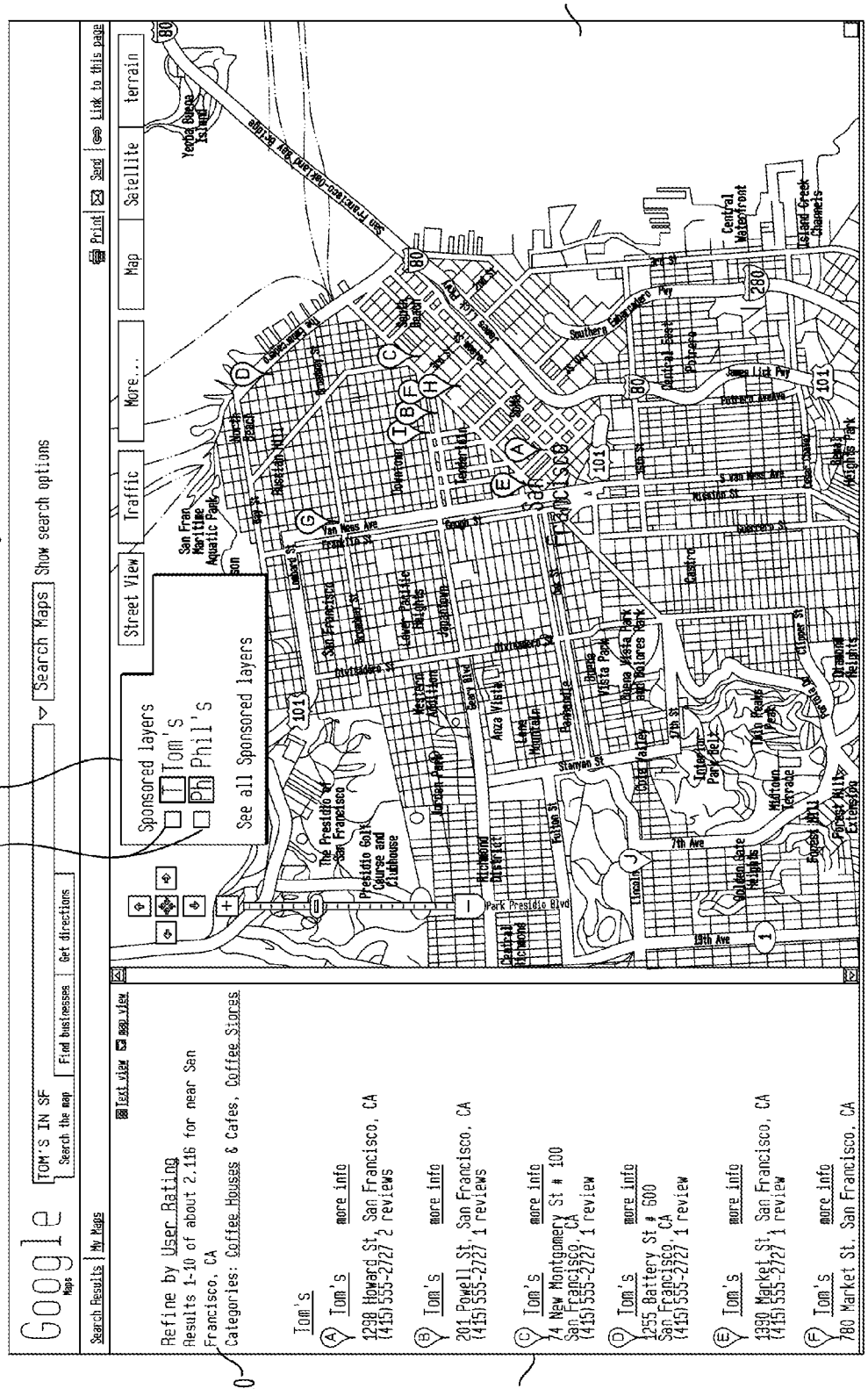

An aspect of the present invention provides location-specific advertisements by generating layers that may be used to overlay the web page showing the search results. FIGS. 4A-4B show an example of a web page in accordance with another aspect of the invention in which a user is provided with the option of displaying one or more such layers on a web page 400. In this example, a user is looking for the locations in San Francisco of a chain coffee houses known as "Tom's" and has entered "toms in sf" as search term 402. The web page displays a list 404 of the business sites located and a map 406 showing the location of each business site. The search engine or similar program that generates the web page also accesses the advertiser data for "Tom's" to determine and display a list categories 410.

In accordance with this aspect of the invention, the search engine or similar program also searches an inventory of location-based advertisements and determines that two advertisers match these categories and have stores in San Francisco. Typically, the targeting of a location-based advertisement to a particular region or regions is indicated in a field within the advertisement data. In the present example, the search engine or similar program searches for advertisements that are tagged specifically for San Francisco, and if such advertisements are not found, searches for advertisements that are tagged for wider regions that include San Francisco.

The web page preferably displays a "sponsored layers" box 408 that lists each located advertiser, an icon associated with that advertiser, and a check box 409 that allows the user may click on to turn on or off the display the of the store locations of that advertiser on the map 406. The icons that are displayed may be determined from the advertiser information or, alternatively, may be address bar icons, "favicons", that appear on the address bar when the advertiser's web page is displayed by a browser program. FIG. 4A shows the sponsored layer 408 adjacent to the list of search results 404. Alternatively, as FIG. 4B shows, the sponsored layers 408 may be displayed atop the map 406.

Figure 5:
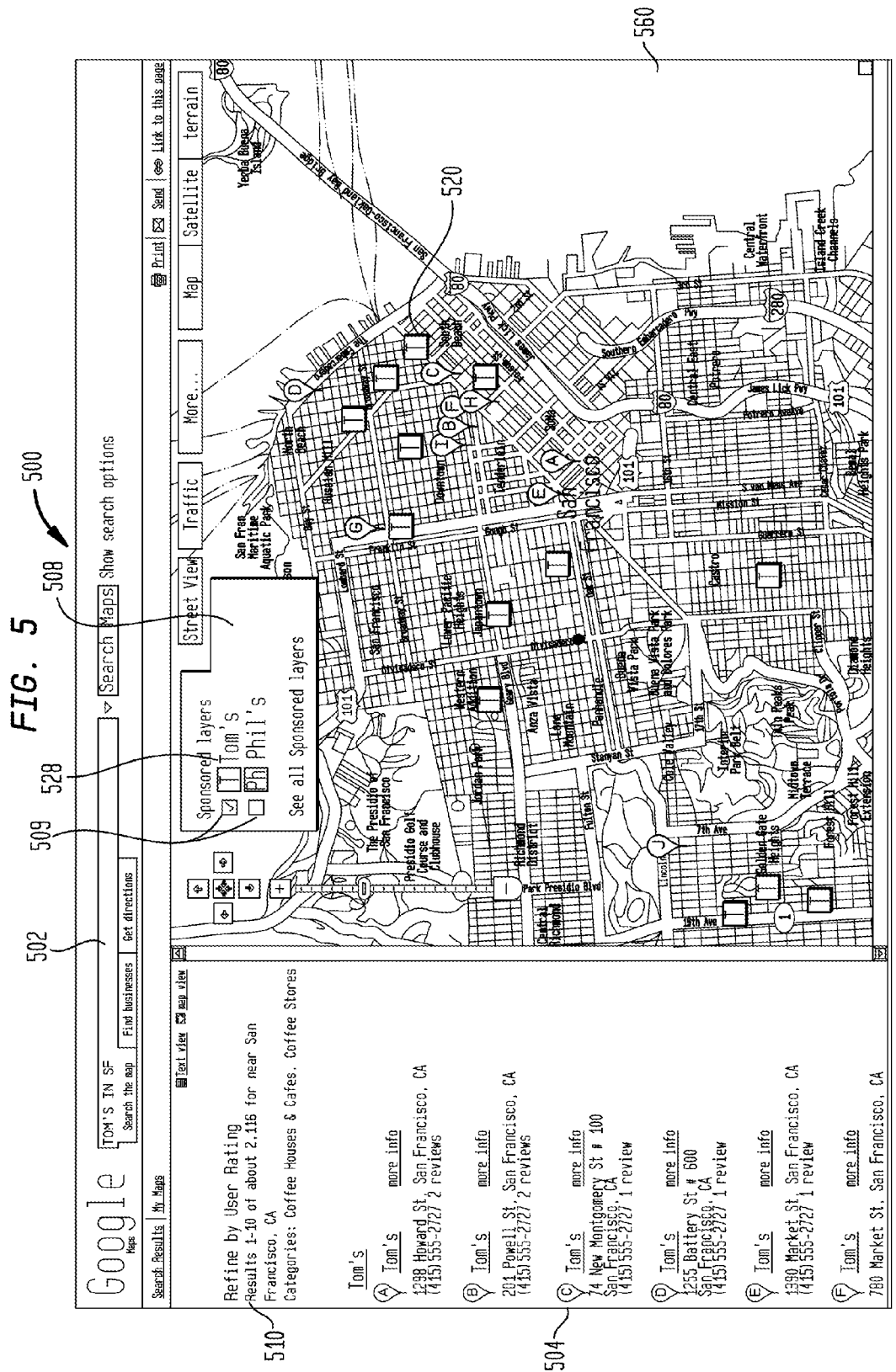
FIG. 5 shows the web page of FIG. 4 with an additional layer displayed.

FIG. 5 shows an added layer that is displayed when the user clicks on one of the boxes in the sponsored layers box shown in FIG. 4B. For example, by clicking the check box next to "Tom's", an additional layer is shown atop the map 506 which displays, at each store location on the map 506, an icon associated with the advertiser. In addition to showing the additional layer atop the current map 506, the search engine or similar program then displays this layer atop any other maps that are displayed as the result of further searches by the user. As an example, if the user next carries out a search that results in the display of a map of Boston, each store location of "Tom's" in Boston will be displayed unless the user clicks off the checkbox next to "Tom's".

Figure 6:
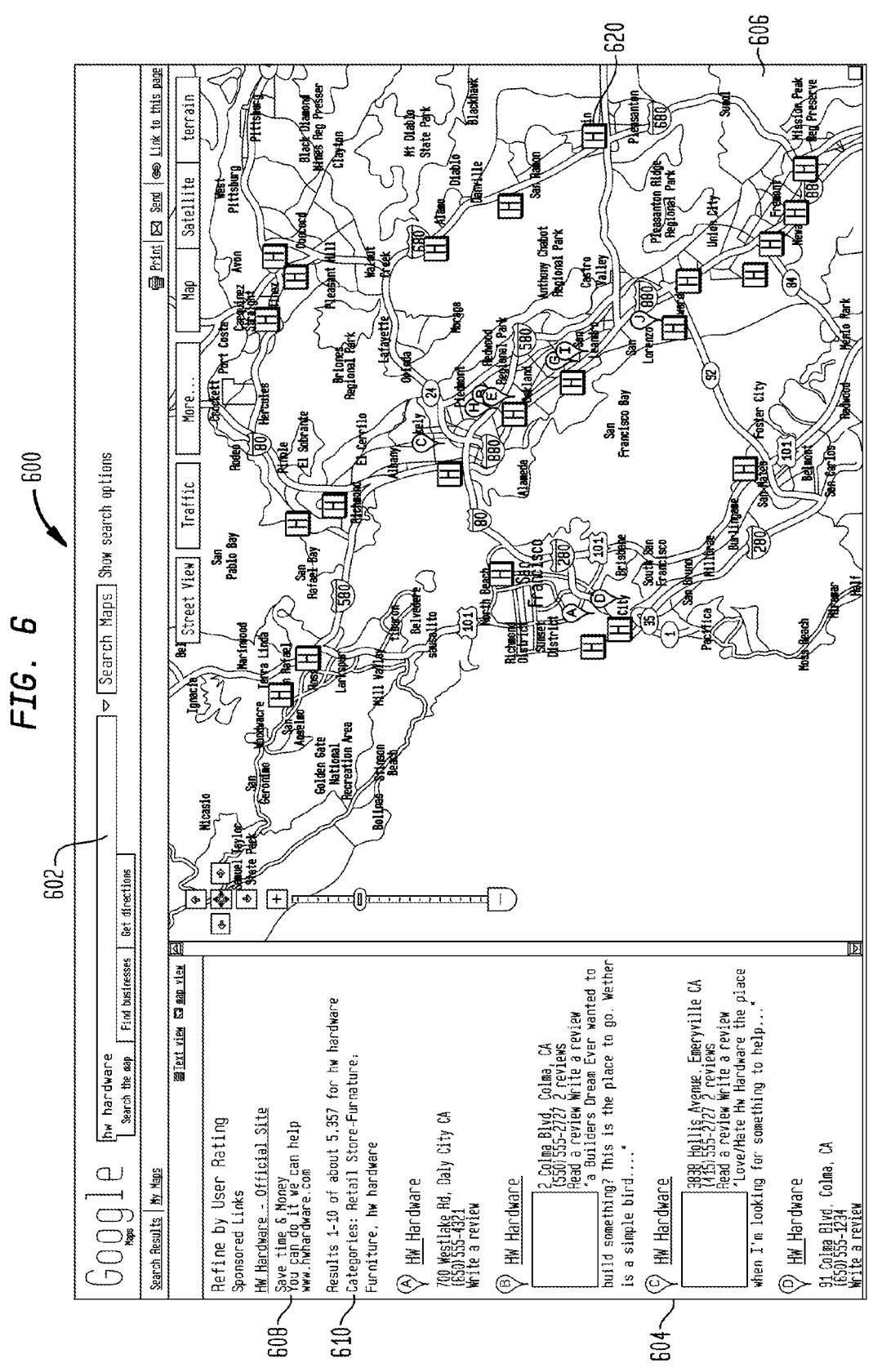

FIG. 6 shows another example in which a web page 600 provides the results of a user search for a hardware store chain known as "HW Hardware". In this example, the additional layer is displayed atop a map of a region and shows an icon associated with "HW Hardware" at each store location within the depicted region.

The web page 600 displays "hw hardware" as the search terms 602, a list 604 of HW Hardware stores in the depicted area, and a map 606 showing the locations of these stores. Additionally, the search engine or similar program determines from the advertiser information that HW Hardware is a paid advertiser so that the web page includes an advertisement 608 for HW Hardware as well as a list of categories 610 that pertain to HW Hardware. Additionally, using the inventory of location-based advertisements, an additional layer is displayed in which a favicon or other icon associated with HW Hardware is shown at each store location.

Figure 7:
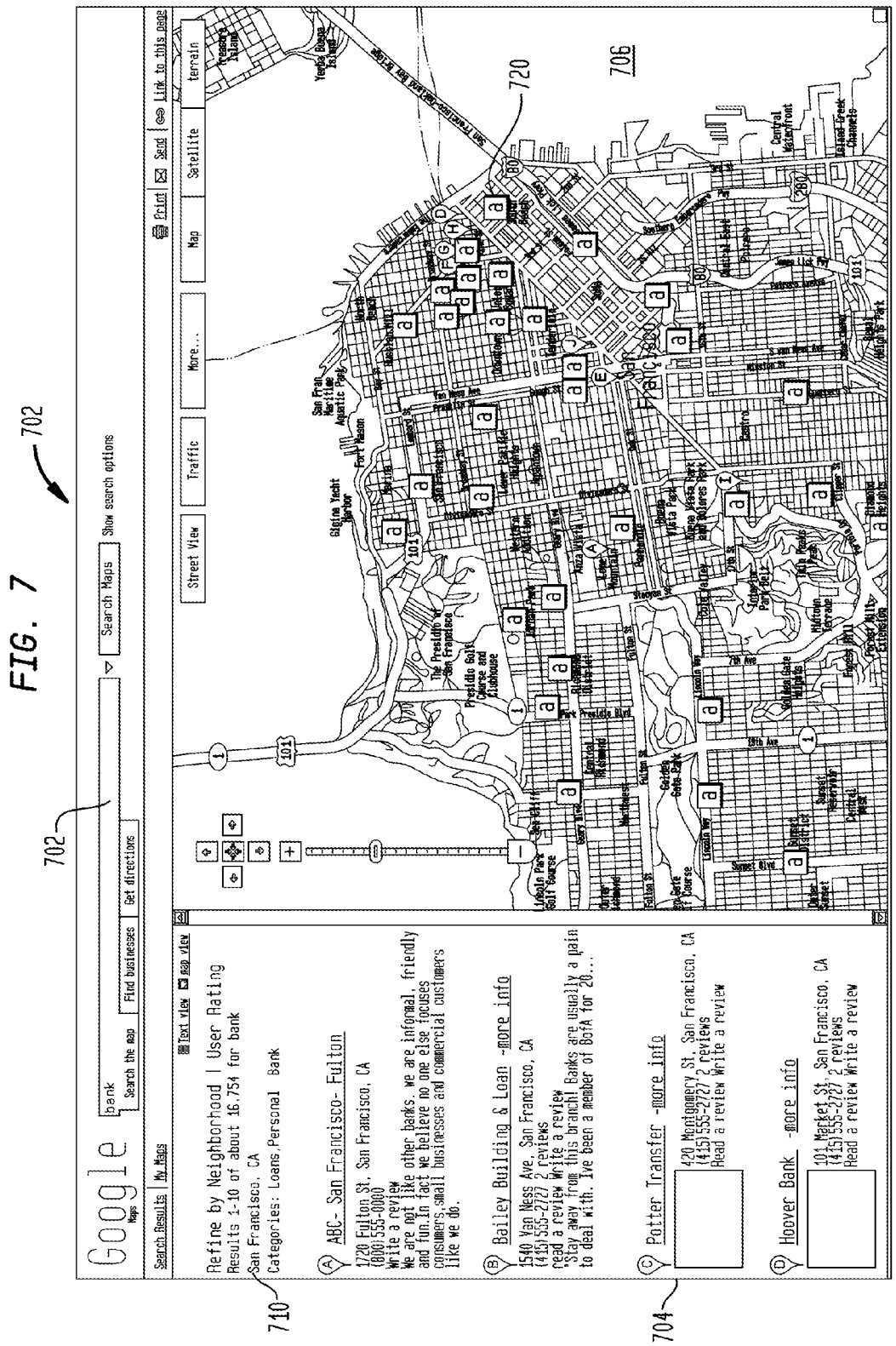
FIG. 7 shows a web page that displays the results of a keyword-based search using layers in accordance with a further aspect of the invention.

Also, in accordance with this aspect of the invention, the user may search for a specific category of business, and the search engine or similar program performs a search that not only takes into account a previously entered location keyword but also identifies the locations of paid advertisers within that location. FIG. 7 shows an example in which the user who carried out the search whose results are shown in FIG. 4A or 4B subsequently carries out a search for a bank. A web page 700 shows the search term 702 "bank", a list 704 of the banks located by the search, and a map 706 shows the locations of the banks. Additionally, using the inventory of location-based advertisements, it is determined that one of the banks located by the search, "ABC Bank", is a paid advertiser, and a layer is displayed showing the favicon associated with the bank at each bank locations.

Figure 8A:
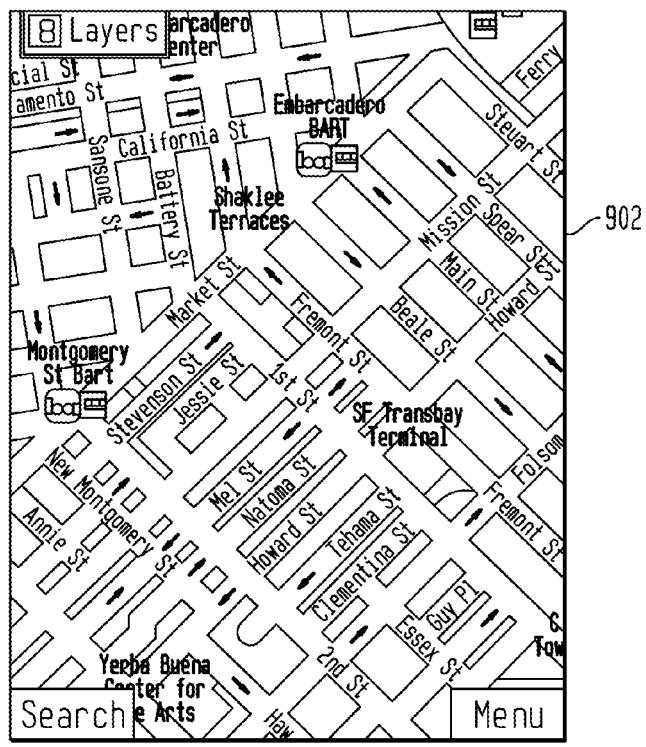
FIGS. 8A-8G show a map with various combinations of layers in accordance with yet another aspect of the invention.
Figure 8B:
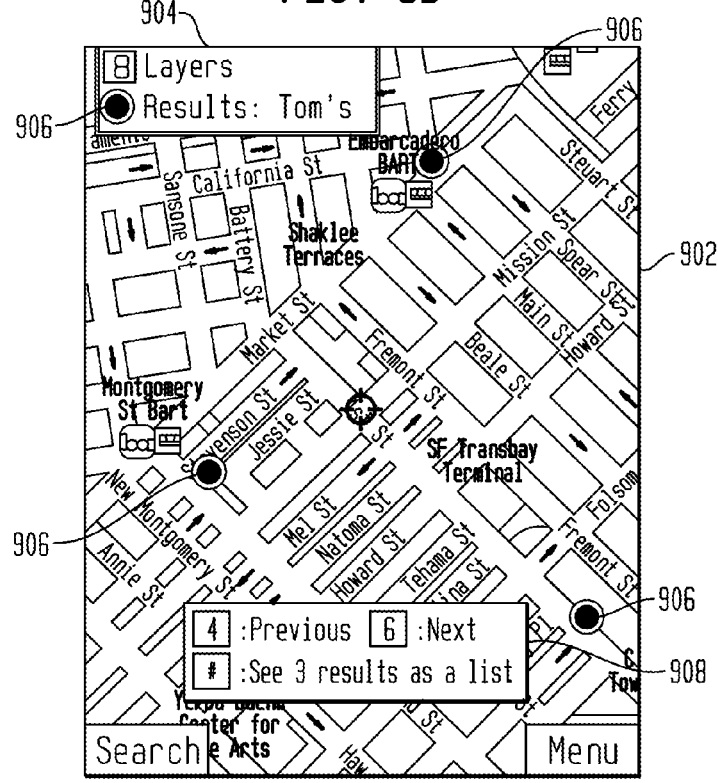

In accordance with yet another aspect of the invention, various layers may be generated and combined to provide different ways of displaying location-based advertisement as shown, for example, in FIGS. 8A-8G. FIG. 8A shows a map 902 of a section of a city, for example, without showing any additional layers. FIG. 8B shows, atop the map 902, another layer that is added after a search for "Tom's" is carried out. The added layer includes a results box 904 that identifies "Tom's" with a marker 906 that is adjacent to its name. A box 908 provides the user with various viewing options. The map 902 also includes markers 906 at each store location of "Tom's".

Figure 8C:
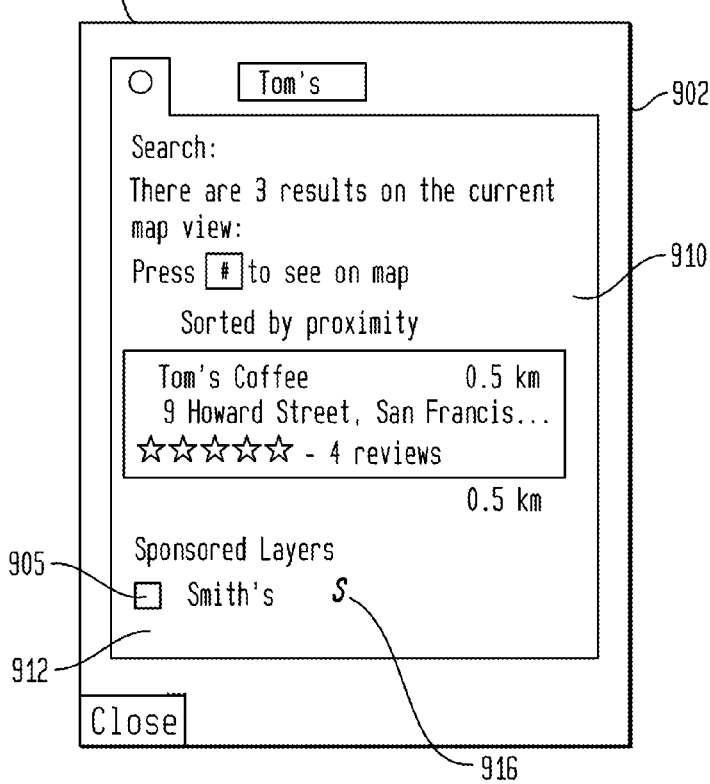

FIG. 8C shows a further layer 910 that may be displayed when the user clicks on a check box next to the phrase "See 3 results as a list" in box 908 shown in FIG. 8B. The layer 910 is either opaque or semi-transparent and covers over the map 902. The layer 910 displays the number of business locations located within or near the region shown in map 902 the searched for business. Also, the layer allows the user to scroll through the individual locations according to some particular order, such as in order of proximity to a particular location.

Additionally, the layer 910 may list a sponsored advertiser, e.g., "Smith's", which may be in the same type of business as the first advertiser or, alternatively, may simply be an advertiser having businesses within the region shown by map 902 shown in FIG. 8A.

Figure 8D:
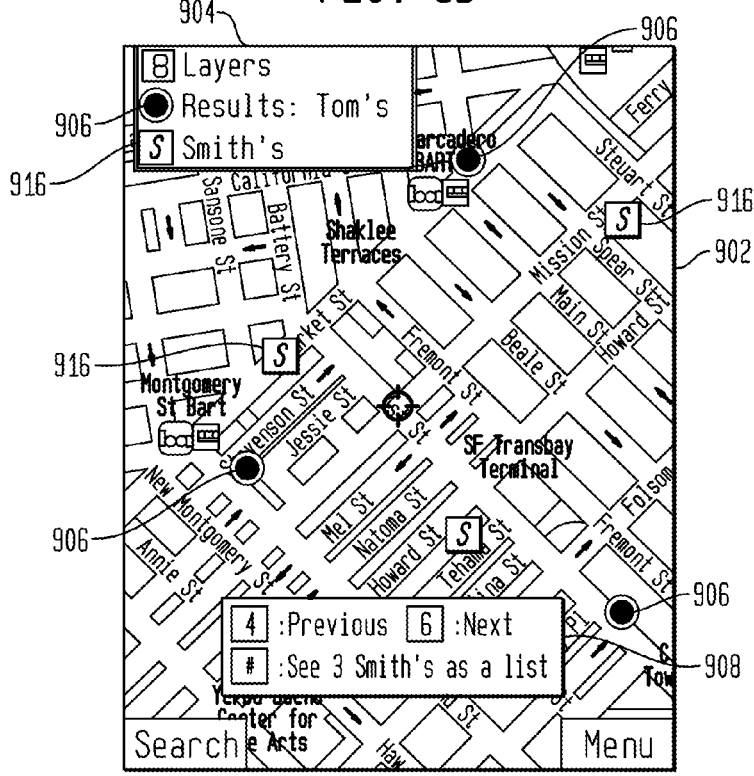
Figure 8E:
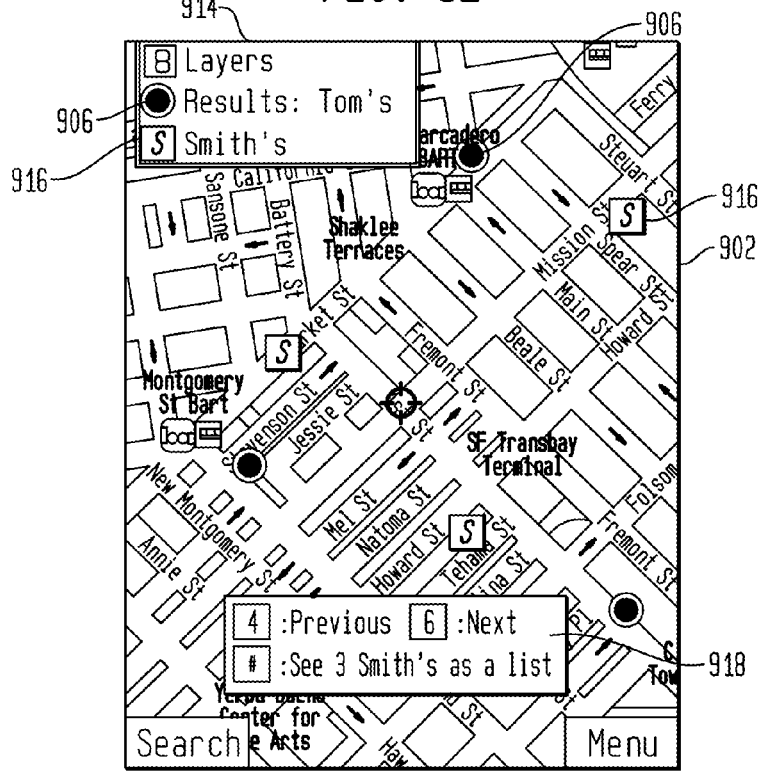
Figure 8F:
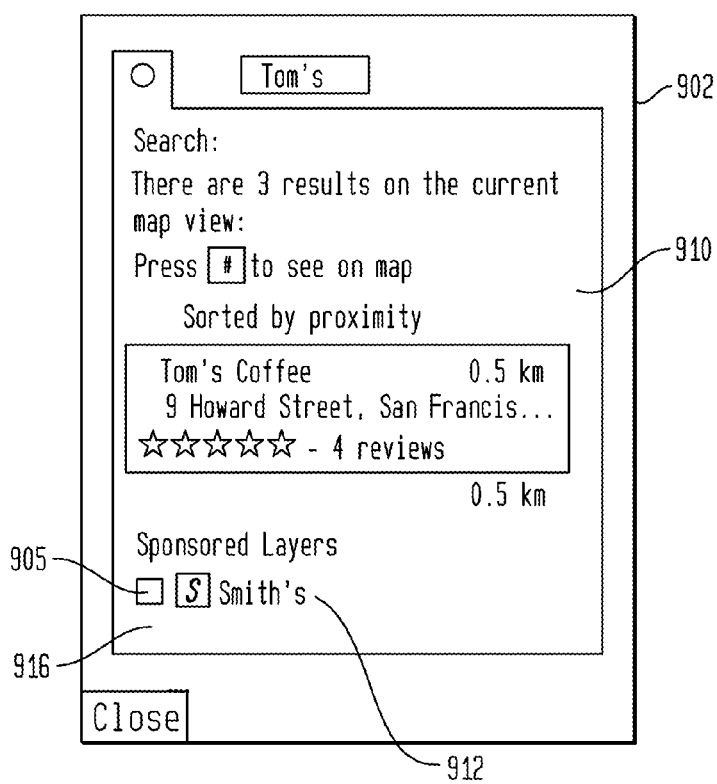
Figure 8G:
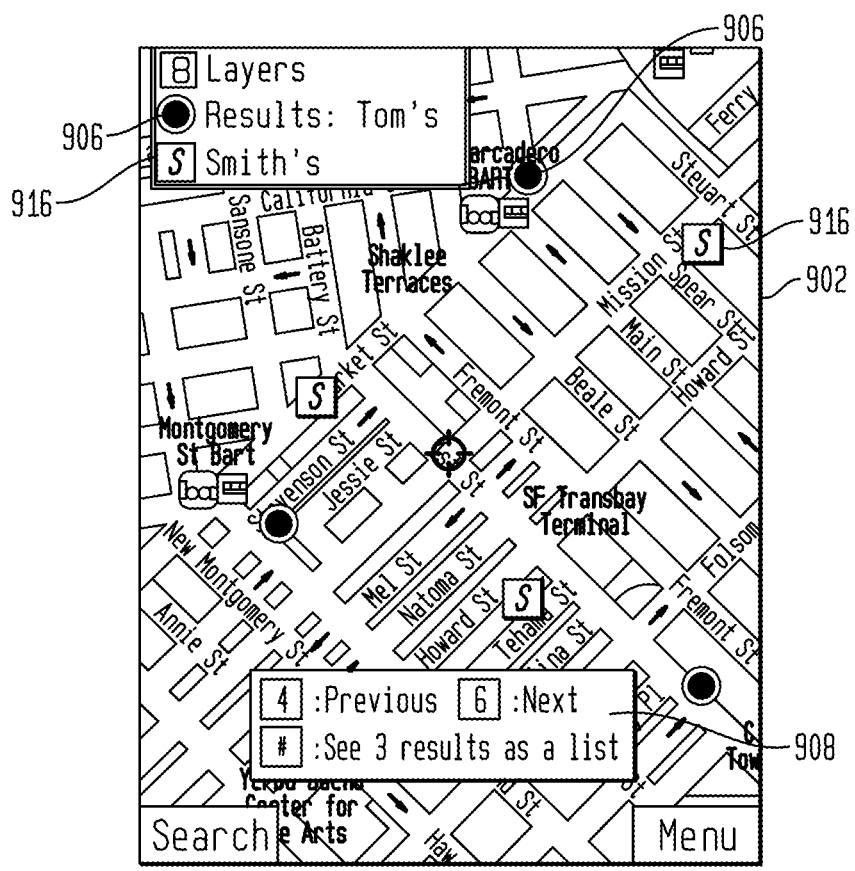

FIG. 8D shows the layers that are displayed as a result of the user clicking on the check box 905 of FIG. 9C. Here, an icon 916 associated with the advertiser "Smith's" is shown at each store location on the map in addition to the icons associated with "Tom's". Alternatively, the layers shown in FIG. 8D are displayed as a result of a user's search for "Tom's" instead of that shown in FIG. 8B. Namely, a layer for an advertiser is automatically displayed as the search result. Then, the user clicks on either "Tom's" in box 914 or "Smith's" in box 914. FIG. 8E shows the results of clicking on the box next to "Smith's" which the layer associated with "Smith's" becomes the active layer so that box 918 allows the user to scroll a list of "Smith's" stores. Alternatively, as FIG. 9G shows, the user clicks on "Tom's" to cause the layer associated with "Tom's" to become the active layer and causes box 908 to be displayed so that the user can select to see three search results as a list.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A computer implemented method comprising:
   retrieving, with one or more computing devices, from a computer-readable electronic database, a name of a particular entity having a plurality of physical locations;
   searching outside of the computer-readable electronic database, with one or more computing devices, for data that contains the name of the particular entity and that contains a business address of one of the plurality of physical locations of the particular entity, by comparing the name of the particular entity to the data outside of the computer-readable electronic database, in order to obtain the business address of each of the plurality of physical locations;
   determining, with the one or more computing devices, the business address of each of the plurality of physical locations for the particular entity from the data outside of the computer-readable electronic database;
   storing, with one or more computing devices, in the computer-readable electronic database, the business address of each of the plurality of physical locations in correlation with one or more keywords associated with the particular entity such that a user-generated query that includes at least one of the keywords and a search location causes the one or more computing devices to execute operations that initiates a search of the computer-readable electronic database for the business addresses of the physical locations that are in proximity to the search location; and
   providing, with the one or more computing devices, at least one result that is displayable to the user.

2. The method according to claim 1, further comprising:
   searching for the database entries that contain a uniform resource locator (URL) associated with the particular entity and that contain the business address of one of the plurality of physical locations of the particular entity to obtain the business address of each of the plurality of physical locations.

3. The method according to claim 1, wherein the searching includes searching within on-line content associated with the particular entity by matching the name of the particular entity to text of the on-line content.

4. The method according to claim 1, wherein the searching searches at least one of a business listing data feed, a web site, or a data file.

5. The method according to claim 1, wherein the storing includes storing one or more details relating to each physical location, and the details relating to a given physical location are selected from the group consisting of a photograph of that physical location, hours of operation for that physical location, a telephone number of that physical location, a URL of a web site for that physical location, and an icon indicating an attribute for that physical location.

6. A computer implemented method comprising:
searching content comprising text to determine location information for each of a plurality of physical locations of a particular entity by comparing a name of the particular entity to the text of the content;
determining the location information for each of the plurality of physical locations for the particular entity from the text of the content;
storing, in a database, the location information of each of the plurality of physical locations in correlation with one or more keywords associated with the particular entity;
receiving, over a network from a user terminal, a user-entered query that includes at least one of the keywords and a search location;
searching the database for the location information of at least some of the plurality of physical locations that are in proximity to the search location;
generating a map of a region that includes the search location;
generating an overlying layer for the map, the overlying layer including one or more markers that are positioned to overlay the map at the at least some of the plurality of the physical locations that are located within the region;
generating a list of the at least some of the plurality of the physical locations that are located within the map region, the list including the name of the particular entity and one or more details relating to each of the at least some of the plurality of physical locations that are within the region; and
transmitting at least the map together with the list over the network to the user terminal for display on a display screen, the map and the list being initially shown concurrently at different regions of the display screen.

7. The method according to claim 6, wherein the one or more markers of the overlying layer are icons associated with the particular entity or are favicons associated with a web site of the particular entity.

8. The method according to claim 6, wherein the transmitting step includes transmitting the overlying layer together with the map such that the map and the overlying layer are initially shown concurrently on the display screen.

9. The method according to claim 6, further comprising providing, on the display screen, a user interface element that can be activated to turn on or off the displaying of the overlying layer.

10. The method according to claim 6, further comprising generating content for the particular entity, and wherein the transmitting step includes transmitting the content together with the map such that the map and the content are shown concurrently at different regions of the display screen.

11. The method according to claim 6, wherein the one or more details relating to each of the at least some of the plurality of physical locations included in the list are selected from the group consisting of the address of that physical location, a photograph of that physical location, hours of operation for that physical location, a telephone number of that physical location, a URL of a web site for that physical location, and an icon indicating an attribute for that physical location.

12. The method according to claim 11, wherein each of the markers of the overlying layer is unique to that physical location, and the list of the physical locations includes, for each physical location, the marker that overlies that physical location.

13. The method according to claim 11, further comprising:
generating a further overlying layer that includes at least part of the list, and
providing, on the display screen together with the map, a user interface element that is selectable to turn on the displaying of the further overlying layer, the further overlying layer obscuring at least part of the map.

14. The method according to claim 13, further comprising:
providing, on the display screen together with the further overlying layer, a user interface element that is selectable to turn off the displaying of the further overlying layer.

15. A system comprising:
a memory that is configured to store a computer-readable electronic database;
a processor that is configured to search for data outside of the computer-readable database that contains identifying data associated with a particular entity and that contains location information of one of a plurality of physical locations of the particular entity to obtain the location information of each of the plurality of physical locations, to determine the location information of each of the plurality of physical locations for the particular entity, and to store, in the computer-readable electronic database, the location information in correlation with one or more keywords associated with the particular entity such that a user-generated query that includes at least one of the keywords and a search location causes a processor to execute operations that initiates a search of the computer-readable electronic database for the location information of the physical locations that are in proximity to the search location, and to provide at least one result that is displayable to the user.

16. The system according to claim 15, wherein the identifier comprises a name of the particular entity or a uniform resource locator (URL) of a web site associated with the particular entity.

17. The system according to claim 15, wherein the processor is configured to search within on-line content associated with the particular entity by matching identifying data contained within the on-line content to identical data contained within the entries.

18. The system according to claim 15, wherein the processor is configured to search at least one of a business listing data feed, a web site, or a data file.

19. The system according to claim 15, wherein the processor is configured to store in the memory one or more details relating to each physical location, and the details relating to a given physical location are selected from the group consisting of a photograph of that physical location, hours of operation for that physical location, a telephone number of that physical location, a URL of a web site for that physical location, and an icon indicating an attribute for that physical location.

20. A system comprising:
a server, including:
a memory that is configured to store a computer-readable electronic database, and
a processor that is configured to search content to determine location information for each of a plurality of physical locations of a particular entity by comparing an identifier associated with the particular entity to the content, to determine the location information for each of the plurality of physical locations for the particular entity from the content, to store, in the database, the location information of each of the plurality of physical locations in correlation with one or more keywords associated with the particular entity, to receive, over a network from a user terminal, a user-entered query that includes at least one of the keywords and a search location, to search the database for location information of the physical locations that are in proximity to the search location, to generate a map of a region that includes the search location, to generate an overlying layer for the map, the overlying layer including one or more markers that are positioned to overlay the map at the physical locations that are located within the map region, to generate a further overlying layer that includes a list of the physical locations that are located within the map region, the further overlying layer obscuring at least a portion of the map, and to transmit at least the map and a user interface element over the network to the user terminal for display on a display screen, the user interface element being configured to toggle a display of the further overlying layer that includes the list of the physical locations that are located within the map region.

21. The system according to claim 20, wherein the one or more markers of the overlying layer are icons associated with the particular entity or are favicons associated with a web site of the particular entity.

22. The system according to claim 20, wherein the processor is configured to transmit the overlying layer together with the map such that the map and the overlying layer are initially shown concurrently on the display screen.

23. The system according to claim 20, wherein the processor is configured to transmit to the user terminal, for display on the display screen, a user interface element that can turn on or off the displaying of the overlying layer.

24. The system according to claim 20, wherein the processor is configured to generate content for the particular entity, and wherein transmitting includes transmitting the content together with the map such that the map and the content are shown concurrently at different regions of the display screen.

25. The system according to claim 20, the processor is further configured to generate the list of the physical locations that are located within the map region, the list including one or more details relating to each listed physical location which are selected from the group consisting of the address of that physical location, a photograph of that physical location, hours of operation for that physical location, a telephone number of that physical location, a URL of a web site for that physical location, and an icon indicating an attribute for that physical location.

26. The system according to claim 25, wherein the processor is further configured to transmit the list together with the map such that the map and the list are initially shown concurrently at different regions of the display screen.

27. The system according to claim 25, wherein each of the markers of the overlying layer is unique to that physical location, and the list of the physical locations includes, for each physical location, the marker that overlies that physical location.

28. The system according to claim 25, wherein the processor is further configured to provide to the user terminal, for display on the display screen together with the map, a separate user interface element that can turn on the displaying of the further overlying layer.

29. The system according to claim 28, wherein the processor is further configured to provide to the user terminal, for display on the display screen together with the further overlying layer, another separate user interface element that can turn off the displaying of the further overlying layer.

* * * * *